Aug. 25, 1931.   H. W. EBERHARDT ET AL   1,820,652
WATER POWER PLANT
Filed June 28, 1929   3 Sheets-Sheet 3

INVENTOR
HERMANN W. EBERHARDT.
KARL FRIEDLMAIER.
BY
Toulmin + Toulmin
ATTORNEY

Patented Aug. 25, 1931

1,820,652

UNITED STATES PATENT OFFICE

HERMANN W. EBERHARDT AND KARL FRIEDLMAIER, OF COLUMBUS, OHIO

WATER POWER PLANT

Application filed June 28, 1929. Serial No. 374,424.

This invention relates to power plants adapted to be used in connection with tides, waves, rapids and waterfalls.

It is the object of this invention to provide an apparatus adapted to use the force of the incoming and outgoing tides and the force of waterfalls for the purpose of raising water and creating a head for the purpose of operating water wheels, particularly turbine wheels.

It is more particularly the object of this invention to provide a series of tanks, one above the other, whereby the water escaping from a lower tank can be used for the purpose of drawing water into an upper and more elevated tank, the water being accumulated in the lower tank by means of the tides or falls or rapids. For this purpose the water is permitted to escape from the lower tank at the lower end thereof, due to the ebbing of the tide or the fall of the rapids.

It is particularly the object of this invention to provide a series of tanks of this kind on each side of a water chute for the purpose of continually supplying water into the chute for operating a water wheel, such as a turbine.

These and other advantages will be apparent from the description, taken in connection with the drawings.

Referring to the drawings.

Figure 1:
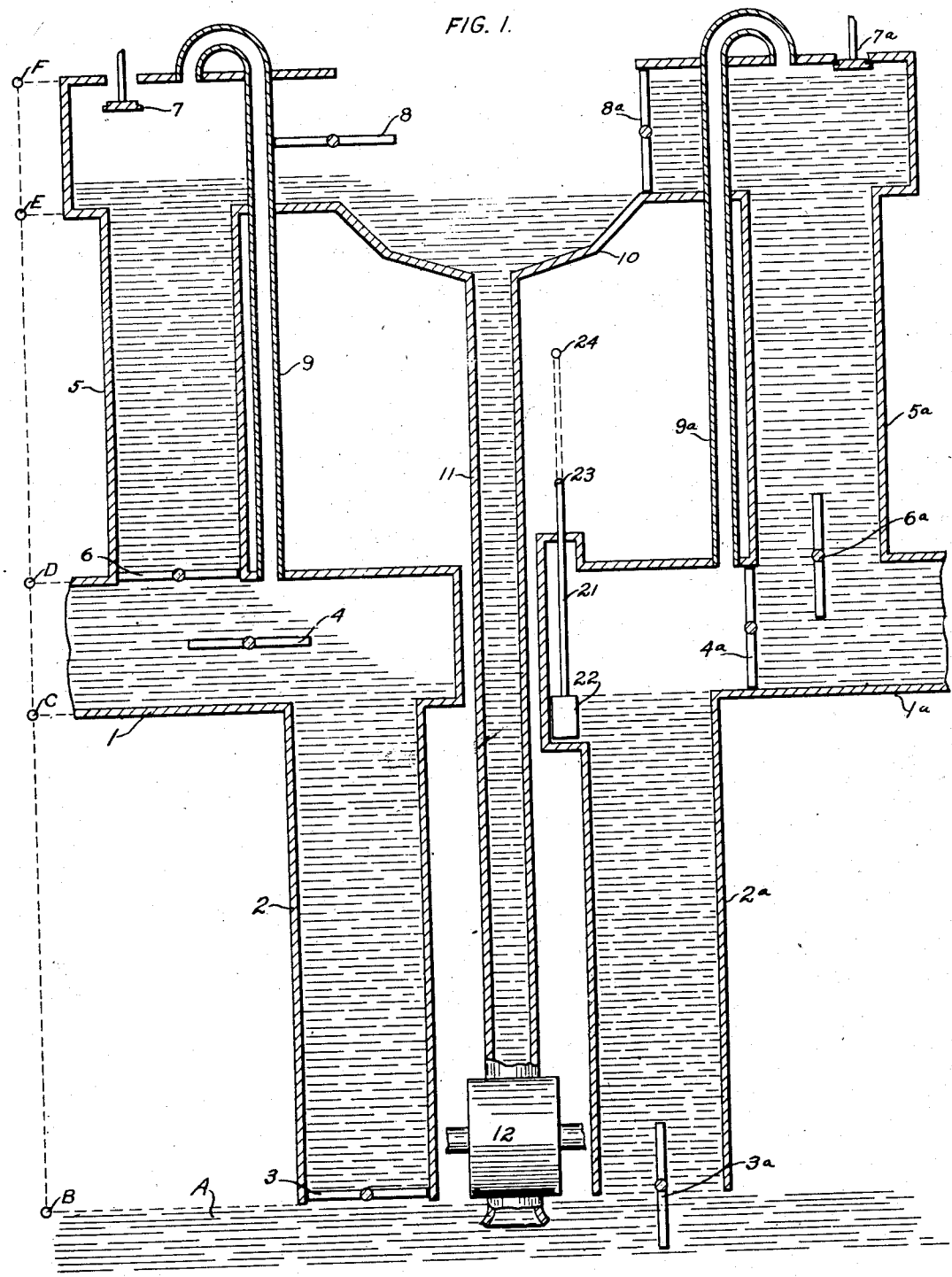
Figure 1 is a diagrammatic view showing a water chute having on each side thereof a pair of tanks and their associated valves, for the purpose of elevating the water into a reservoir from which the water flows through the chute.

This invention relates to apparatus for utilizing the force of tides and falls for raising water. In Figure 1 the normal level of the water between high tide and low tide is indicated by the letter A, when the apparatus is used in connection with tides. When the apparatus is used in connection with streams of water in which there are falls, this letter A represents a lower level of the streams of water, while the upper level would be indicated by the sluice 1, which receives water either from the incoming tide or from a waterfall.

The water passing through the sluice 1 enters the tank 2, which is closed at the bottom by means of a valve 3. The flowing of the water from the sluice 1 into the tank 2 is regulated by a valve 4.

For the purpose of distinguishing the part of the apparatus shown on the lefthand side of the chute 11 from the part shown on the righthand side of the chute 11, the reference numerals without any letters are used to designate the parts of the apparatus on the lefthand side, while the same reference numerals with the letter $a$ are used to designate the same part of the apparatus found on the righthand side of Figure 1. This use of reference numerals applies throughout all the figures.

Upwardly extending from the sluice 1 is a tank 5, and the opening between the sluice and this tank is controlled by means of a valve 6. Water from the sluice will enter the tank 5 when the valve 6 is open. The upper part of the tank is closed with the exception of two openings controlled by valves. One valve, indicated by the numeral 7, is an air valve for the purpose of admitting air into this tank when the water is being discharged therefrom, while the other valve is indicated by the numeral 8 and is used for the purpose of discharging the water therefrom into a reservoir 10.

Extending from the upper extremity of the tank 5 downwardly into the sluice 1, or rather that part of the sluice immediately above the tank 2, is a suction pipe 9. In the position shown in Figure 1 the water is flowing from tank 5 into the reservoir 10, from which it enters the chute 11 and operates by means of pressure the water wheel 12.

At this time the water is passing from the sluice 1 into the tank 2, which is almost full. When the tank 2 becomes full contacts are made which operate the valves whereby the valves are all shifted. Valve 3 becomes open; valve 4 is closed; 6 is open, 7 is closed and 8 is closed. When the valves are in this position on the lefthand side of the apparatus those on the righthand side are reversed, and under this condition the water will flow from the tank 2 out through the valve opening at the lower end thereof, so that a suction is created in the tank 5 by means of the pipe 9. This suction will draw the water from the sluice 1 up into the tank 5 and fill it completely full. Since the same amount of water will be drawn into tank 5 as is discharged from tank 2, and these tanks are both of the same size, and since 2 becomes empty 5 will become filled. During this operation the tank 5 is being filled, since the valve 8 is closed, the tank 5a is being emptied since the valve 8a is open, and the water is flowing from the tank 5a into the reservoir 10. By this means there is a continuous supply of water into the reservoir 10 for the purpose of supplying water to the mill chute 11 to operate the water wheel 12.

Figure 2:
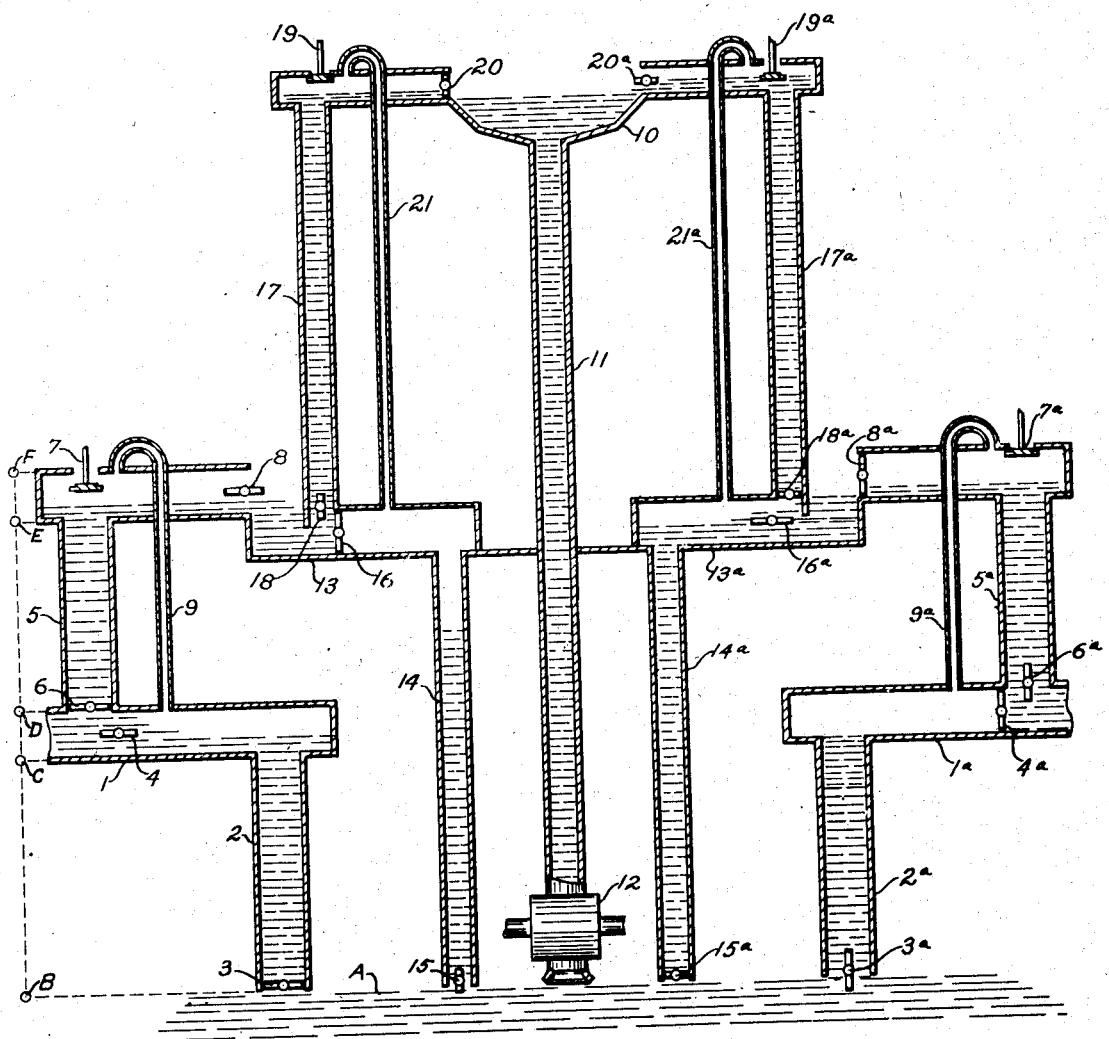
Figure 2 is a diagrammatic view showing a plurality of pairs of tanks on each side of the chute, one pair of tanks extending higher than the other and receiving water from the other for the purpose of delivering it into a reservoir.

While in Figure 1 there is shown only one pair of tanks on each side of the chute, each pair being fed by water through a sluice 1 and 1a, there may be a multiplicity of pairs arranged in relation to each other as shown in Figure 2. In Figure 2, instead of the first or lower pair forcing the water into the reservoir, they force the water into water heads 13 and 13a. The corresponding parts shown in this figure are indicated by the numerals without and with the a.

Extending from the water head 13 and downwardly therefrom is a tank 14, which has at the lower end thereof a valve 15. Separating the upper part of the tank 14 from the water head is a valve 16. This valve performs a function similar to the valve 4 found in Figure 1.

Extending upwardly from the water head 13 is a tank 17. This tank is closed at the top, with the exception of two valves, and entrance of water into this tank from the water head is controlled by the valve 18. The numeral 19 is used to designate an inlet air valve similar to valve 7, while the numeral 20 designates an outlet valve similar to valve 8 of the form shown in Figure 1.

The suction pipe is indicated by the numeral 21. The operation of the form shown in Figure 2 is similar in every respect to that shown in Figure 1, with the exception that there is a second elevation of the water. In the first elevation of the water the water is carried into the water heads 13 and 13a instead of into the reservoir 10. As shown in Figure 2 the water is being drawn from the water head 13 by the valve 18 into tank 17 by means of the suction created therein by the water being discharged at the lower end of the tank 14 through the open valve 15.

While this is taking place the part of the apparatus on the righthand side is reverse in its action. In the part shown on the righthand side the tank 17a is being discharged into the reservoir 10 because the valve 20a is open for the discharge of the water, and the valve 19a is open for the purpose of admission of air. At the same time the water head 13a is being filled from the first pair of tanks on the right, in the lower pair of tanks on the righthand side of Figure 2 the water is being drawn from the sluice 1a into the tank 5a.

When the operation of drawing the water into the tank 5a is completed, the valve 8a is open and the water passes into the head 13a. From this head the water is drawn into the tank 17a, from which it can pass into the reservoir 10. The purpose of the apparatus is to have the reservoir to be continuously fed from one or the other of the parts of the apparatus so that there will be a uniform pressure exerted by the column of water in the chute 11 upon the water wheel 12.

Figure 3:
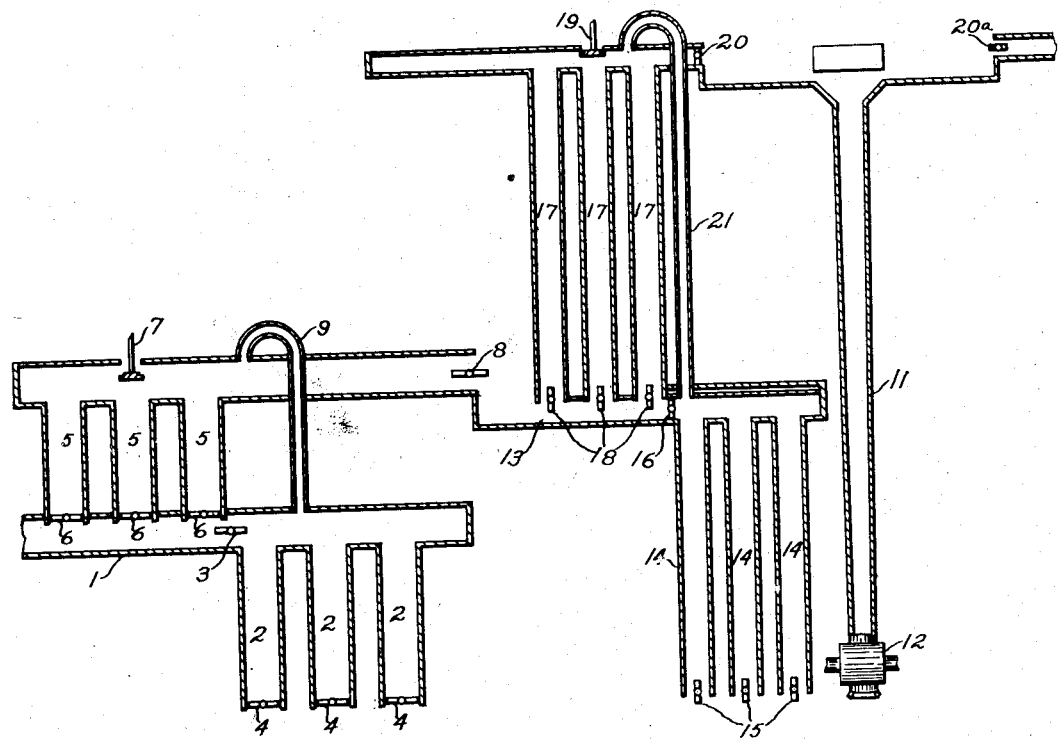
Figure 3 is a diagrammatic view similar to Figure 2 with the exception that in each pair of tanks there is a plurality of tanks serving the same purpose as the single tank in Figure 2.

In Figure 3 there is shown a multiplicity of tanks 2, 5, 17 and 14. It is to be understood that a similar structure is to be found on the right hand side of the chute 11 as that shown on the lefthand side. The apparatus as here shown operates in the same manner as that shown in Figures 1 and 2, the only difference being in the number of tanks found in each group of tanks. The valve control and the principle of operation are the same in both instances.

Figure 4:
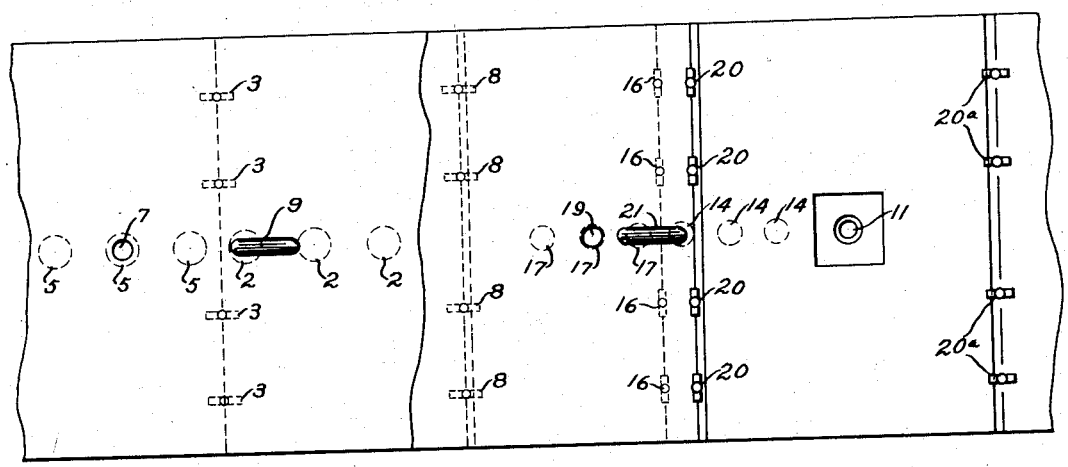
Figure 4 is a plan view of the apparatus as shown in Figure 3.

In Figure 4 there is shown a plan view of the form shown in Figure 3. It is to be understood that there may be any number of tanks grouped together for the purpose of supplying the water from one tank to another, and ultimately to the reservoir above the chute. The number and arrangement of the tanks are controlled entirely by the supply and demand for water and water power.

The valves or gates may be operated by any suitable means. The only thing necessary is that these valves operate alternately by groups. When valves 4, 8, 3a and 6a are open the other valves 3, 6, 4a and 8a must be closed, and after the tanks have been properly discharged and filled the valves shift, all at the same time, so that the valves that were originally open become closed and those originally closed become open. By this means a constant flow of water is produced from a head or sluice in a reservoir 10, from which the water flows through a pipe to be used for power purposes. A device of this kind is particularly advantageous for creating and maintaining a permanent working head of water.

The operation of that form shown in Figure 1 is as follows. The water is entering through the sluice 1 into tank 2 for the purpose of filling this tank, which is nearly full. While this tank is being filled the water from tank 5 is being discharged through valve 8 into the reservoir 10. This discharge is effected by gravity. After the tank 2 has become full all of the valves are automatically shifted. Valve 3 is open; 4 is closed; 6 is open and 7 and 8 are closed.

The water is still running through the sluice 1 but not sufficiently to raise it up into the tank 5. To effect this the water flows out through the lower part of the tank 2, since the valve 3 is open, and creates a vacuum in the upper part of the tank 5, whereby the water is drawn into tank 5 because of the air being exhausted through the tube 9. By the time the water has become fully exhausted from the tank 2 the tank 5 is practically full. In this position the tank 2 is again filled, and the water from tank 5 flows again into reservoir 10.

While the description applies to the action in the two tanks to the left of the chute, the same action takes place in the part of the tank to the right of the chute, but in reverse operation. While the tank 2 is being filled tank 2a is being emptied, and while tank 5a is being emptied tank 5 is being filled. This same operation takes place through all of the forms shown in each of the figures of the drawings. In fact, the figures do not show different forms but merely the same apparatus with a multiplicity of tanks operating in the same manner and under the same principles.

In Figure 1, B represents low tide and the distance between B and D represents the rise in the tide or the fall in the river. Under normal conditions of water fall and tide the water will pass in at sluice 1. For the purpose of supplying a sufficient amount of water head the sluice 1 and the sluice 1a may be considerably extended in length. This length is to be determined by the nature of the tides and the fall of the water where the apparatus is located. In extreme high tides the water from the tide may be conducted into tanks 5 and 5a, and for this purpose suitable valve means may be provided. In this instance the full amount of tide rise or the fall of the water would be indicated by the distance between B and F, as shown in Figure 1. The advantage of having one set of tanks located above the other is not only that water can be drawn by means of a siphon from a lower to a higher, but the higher tanks may be utilized in case of high tides and high falls.

We desire to comprehend within our invention such modifications as may be clearly embraced within our claims and the scope of our invention.

Having thus fully described our invention, what we claim is new and desire to secure by Letters Patent, is:

1. In a water power plant, a pair of tanks, sluice means for alternately creating a head of water in said tanks, a second pair of tanks about the first pair and resting on said sluice means, means operable by the discharge of water from said first pair of tanks to alternately fill the second pair of tanks, and means to alternately discharge the water from said second pair of tanks.

2. In a water power plant, a pair of tanks, sluice means for alternately creating a head of water in said tanks, a second pair of tanks above the first pair and resting on said sluice means, means operable by the discharge of water from the first pair of tanks to alternately fill the second pair of tanks, a mill having a chute, and means for alternately discharging the water from said second pair of tanks into said chute.

3. In a water power plant, a pair of tanks, sluice means for alternately creating a head of water in said tanks, a second pair of tanks above the first pair and resting on said sluice means, suction means operable by the discharge of water from the first tanks to alternately fill the second pair of tanks, and means to alternately discharge the water from said second pair of tanks.

4. In a water power plant, a pair of tanks, sluice means for alternately creating a head of water in said tanks, a second pair of tanks above the first pair and resting on said sluice means, suction means operable by the discharge of water from the first pair of tanks to alternately fill the second pair of tanks, a mill having a chute, and means for alternately discharging the water from said second pair of tanks into said chute.

5. In a water power plant, a mill chute, a plurality of pairs of tanks on each side of said chute, one tank of each pair being above the other and connected thereto, means to conduct water from the upper tank of one pair of tanks to another pair at the point of connection, and means operated by the water flowing from the lower tank of each pair to cause water to enter its upper tank, the tanks on one side of the chute being alternately filled and discharged to the filling and discharging of the tanks on the other side, the upper tanks of the pairs which receive water from the other pairs discharging water into the mill chute.

6. In a water power plant, a mill chute, a plurality of pair of tanks on each side of said chute, one tank of each pair being above the other and connected thereto, means to conduct water from the upper tank of one pair of tanks to another pair at the point of connection, and suction means operated by the water flowing from the lower tank of each pair to cause water to enter its upper tank, the tanks on one side of the chute being alternately filled and discharged to the filling and discharging of the tanks on the other side, the upper tanks of pairs which receive water from the other pairs discharging water into the mill chute.

7. In a water power plant, a mill chute, a plurality of pairs of tanks of different heights on each side of said chute with the higher pairs of tanks adjacent the chute and successively lower pairs of tanks more remote from the chute, one tank of each pair of tanks being above the other, means to conduct water from the higher tank of one pair of tanks to a higher pair of tanks, means operated by the water flowing from the lower tank of each pair to cause water to enter its upper tank, the tanks on one side of the chute being alternately filled and discharged to the filling and discharging of the tanks on the other side, and means to discharge the water from the upper tank of each adjacent pair into said mill chute.

8. In a power plant, a closed end water sluice, a tank extending downward from said sluice, a second tank extending upward from said sluice, a valve in the lower end of each tank and in the sluice between the tanks, and a pipe extending from the upper end of the second tank to the sluice above the first tank, said valves being operable to fill one tank and by the discharge of water therefrom to fill the other tank.

9. In a water power plant, a sluice ending in a vertical downwardly extending tank, a second tank resting upon the sluice and having its bottom open into the sluice, a gate valve at the lower end of each tank and in the sluice between the tanks, and means operated by the discharge of water from the first tank to draw water into the second tank.

10. In a water power plant, a sluice ending in a vertical downwardly extending tank, a second tank resting upon the sluice and having its bottom open into the sluice, a gate valve at the lower end of each tank and in the sluice between the tanks, and suction means operated by the discharge of water from the first tank to draw water into the second tank.

11. In a water power plant, a sluice ending in a vertical downwardly extending tank, a second tank resting upon the sluice and having its bottom open into the sluice, a gate valve at the lower end of each tank and in the sluice between the tanks, and a pipe extending from the upper end of the second tank to the sluice operated by the discharge of water from the first tank to draw water into the second tank.

12. In a water power plant, a pair of sluices, each ending in a vertical downwardly extending tank, a second vertical tank resting upon each sluice and having its bottom open into the sluice, a sluice on the upper end of each second tank adapted to receive water therefrom, each upper sluice ending in a vertical downwardly extending tank, a tank on each upper sluice and having its bottom open into the sluice, and means operable to cause the alternate discharge of water from the lower sluices to raise water alternately to the upper sluices and to the tanks on the upper sluices.

In testimony whereof, we affix our signatures.

HERMANN W. EBERHARDT.
KARL FRIEDLMAIER.